Feb. 20, 1940. L. A. TARBOX ET AL 2,191,403

METHOD FOR FILTERING

Filed April 30, 1938

WITNESS:

INVENTORS

Leon A. Tarbox
William H. Barcus
BY
ATTORNEYS.

Patented Feb. 20, 1940

2,191,403

UNITED STATES PATENT OFFICE 2,191,403

METHOD FOR FILTERING

Leon A. Tarbox, Prospect Park, and William Herman Barcus, Upper Darby, Pa., assignors to Sun Oil Company, Philadelphia, Pa., a corporation of New Jersey Application April 30, 1938, Serial No. 205,164

4 Claims. (Cl. 210—131)

The present invention relates to a method for filtering, more particularly to a method for the percolation filtration of lubricating oils, and the like, through adsorbent filtering materials such as fuller's earth, activated carbon, etc., which for the sake of brevity will be hereinafter referred to as "clay".

In the percolation filtration of lubricating oils and the like, the liquid to be filtered, is admitted to the top of the filter and allowed to percolate through the mass of filtering material such as fuller's earth or clay contained therein and is removed from the bottom of the filter, being purified by the adsorptive action of the clay during its passage therethrough.

When the relatively large filters used are charged with clay, the clay is frequently not firmly packed, and a great deal of air is often entrapped in the body of the clay, so that when the oil is charged to the filter the clay may settle, or large bubbles of air may collect in the filter, with the result that the body of clay in the filter will be honeycombed and not uniformly packed.

The oil in its flow through the filter will, of course, seek to follow the path of least resistance and due to the honeycomb structure of the clay bed may form channels through the clay so that it flows through the filter too rapidly, and does not come in contact with the clay sufficiently to properly purify the oil. Also the lower portion of the clay may settle leaving the upper portion supported by an arch of the clay which will suddenly collapse while the filter is on stream, so that the clay is so stirred up that the oil will not be properly purified thereby.

When such channeling occurs the filter would have to be shut down, emptied and re-charged, even though the filter has not been on stream long enough for the whole bed of clay to lose its activity, so that there was large unnecessary waste of time during which the filter was out of operation, as well as loss of adsorbed oils, steam, etc., necessary in reclaiming the fuller's earth.

The object of this invention is to provide a method for filtering whereby incipient channeling and the like maye be detected and in which the operation of the filter may be so controlled that the tendency towards channeling will be minimized and in which, in case of incipient channeling, steps may be taken to prevent its assuming serious proportions.

Reference should be made to the accompanying drawing:

Fig. 1 of which is a diagrammatic representation of an apparatus which is adapted for carrying out the process.

Figure 1:
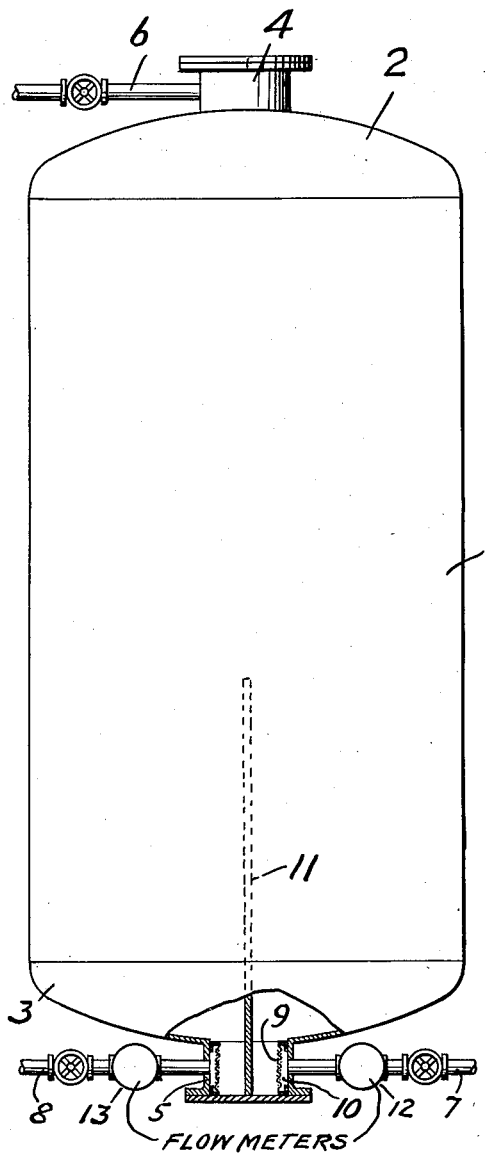

As shown in the drawing, the filter consists of a cylindrical body 1, having a top 2, and a bottom 3 in the form of dished heads. A covered manhole 4 is provided in the top 2, and is preferably centrally located therein. A similar covered manhole 5 is provided at the center of the dished bottom. A valved inlet line 6 is provided at the top of the filter. An annular screen or sieve 9 is positioned in the manhole 5 so as to form an annular space 10 therein, with which the valved outlet lines 7 and 8 communicate, the screen 9 serving to prevent the escape of clay with the outgoing oil. Flow meters 12 and 13 of any desired type, such as rotometers, dispacement, orifice, or Venturi tube flow meters, are provided in valved outlet lines 7 and 8 respectively to measure the rate of flow therethrough.

The body of the filter, or at least the lower portion thereof, is in the form shown in Fig. 1, divided into a plurality of sections by partitions. As here shown it is divided into two sections of hemispherical cross-section by central partition 11. It is, of course, to be understood that the bottom can be divided into any number of sections desired or which is found best adapted for the particular use to which the filter is put, a valved outlet line with a flowmeter therein being provided for each section.

In operation, assuming that the filter is empty, the bottom manhole 5 is closed and the top manhole 4 opened, and clay or other filtering material, is charged to the filter in any desired manner until the level of the clay in the filter rises to the desired height, generally to the height of the dished head 2. The oil inlet line 6 and outlet lines 7 and 8 are then opened, and oil is admitted to the filter through inlet line 6 and permitted to settle through the bed of clay in the filter. When the filter has been filled with oil the inlet and outlet lines may be closed for a time to permit the oil to thoroughly soak into the clay. As soon as the bed of clay in the filter is saturated with oil, either with or without the soaking period above mentioned, the top manhole 4 is then covered while valved inlet line 6 and valved outlet lines 7 and 8 are opened and the filtered liquid which percolates through the body of clay in the filter is continuously withdrawn from the filter through lines 7 and 8 while fresh oil is continuously admitted to filter through inlet 6. If necessary pressure may be maintained on the incoming oil to force it through the clay bed or it may be allowed to percolate therethrough by gravity.

The rate of flow from the valved outlet lines 7 and 8 is shown by flow meters 12 and 13. In case the flow from one of these outlets exceeds the flow from the other, it is apparent that the oil is flowing through that portion of the filter served by the outlet line having the greatest rate of flow at a higher rate than it is flowing through the other section or sections, since all the sections of the filter are of equal capacity. This increased flow from one section is an indication that there is incipient channeling in that section of the filter and to prevent the channeling from becoming serious, it is necessary to decrease the rate of oil flow through that section, so that the rate of flow from all the sections of the filter is the same. In order to accomplish this the valves in lines 7 and 8 are so adjusted that the flow through each line, as shown by the flow meters 12 and 13, will be substantially equal.

It has been found from experience that when the flow is thus controlled, no further channeling will take place. In other words, it has been found that when the rate of flow of oil from the outlets is so controlled that the flow from each outlet is substantially equal to that from the other outlet or outlets, there is much less tendency for channels to form in the bed of clay in the filter.

In case of serious channeling it would generally occur only in one section of the filter, and this section may then be cut off entirely and oil discharged through the remaining outlets.

Figure 3:
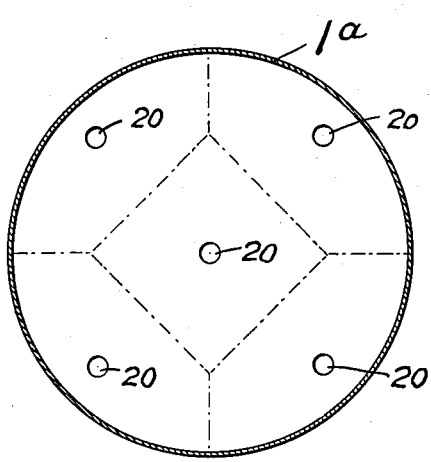
Fig. 3 is a plan view of the modification shown in Fig. 2.
Figure 2:
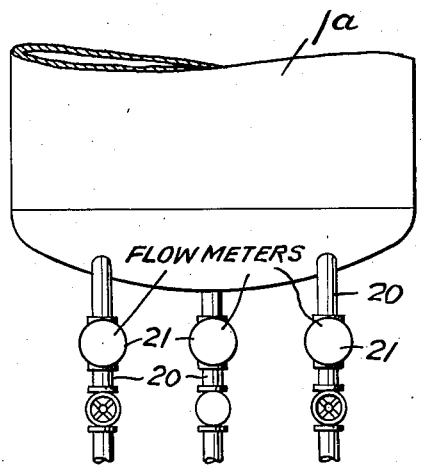
Fig. 2 is a view of the bottom of a filter of slightly modified design.

While the operation of the present invention has thus far been described in conjunction with the type of apparatus illustrated in Fig. 1 of the drawing in which the bottom of the filter is divided into a plurality of sections by means of partitions, it has been found that it is not necessary that such partitions be used. It has been found that many of the advantages of the present invention can be obtained by merely providing a plurality of spaced-apart outlets from the filter, it generally being desirable that each outlet serve a substantially equal cross-sectional area of the filter. Such an arrangement is shown in the modification illustrated in Figs. 2 and 3 of the drawing. In this case five outlets 20 are provided in the bottom of the filter and are so placed that each of the outlets drains substantially one-fifth of the total cross-sectional area of the filter as indicated by the dotted lines. No partitions are necessary to divide the filter into a plurality of sections. In other respects, the arrangement shown in Figs. 2 and 3 is substantially identical with that heretofore described. The outlet line meeting with each of the outlets 20 has placed therein a flow meter 21 of any suitable or desired construction and a valve is provided in each outlet line for regulating the rate of flow through each line.

The operation of a filter provided with a large number of outlets such as that shown in Figs. 2 and 3 is similar in all respects to the operation of the filter heretofore described in connection with Fig. 1. Since each outlet serves an equal cross-sectional area of filter the rate of flow from each outlet is maintained substantially to the rate of flow of other outlets, and should any outlet show an increased rate of flow as compared with other outlets, the rate of flow from such an outlet is controlled by regulating the valve in the outlet line.

While the invention has been described in connection with having each outlet serve an equal cross-sectional area of the filter, it is apparent that the outlet need not necessarily serve the same cross-sectional area of the filter, but in such a case the rate of flow from the outlets should be proportional to the cross-sectional area of the filter which they serve.

In conjunction with the present invention it is possible to regulate the rate of flow from the various outlets so that a higher rate of flow can be maintained from some of the outlets than is maintained from other outlets. As an example of this in filtering certain types of oil, there is a high heat loss in those portions of the filter near the outer shell of the filter. In order to compensate for this heat loss, it may be desirable to cause the oil to flow more rapidly through the outer sections of the filter than through the inner sections. In such a case the rate of flow from the outer sections, as shown by the flow meters on the outlet lines in such sections, is controlled so that the amount of oil passing through a given unit of cross-sectional area of such sections per unit of time is greater than that for the interior sections of the filter.

The optimum rate of flow through a filter is subject to wide variations depending on the character of the liquid being filtered, the filtering medium, the temperatures and pressures maintained in the filter, and on various other conditions which are variable for each particular operation. It is therefore impossible to specify definite filtering rates in the present specification. However, such rates are generally well known and can be determined for any particular operation. When such rates are determined, the rate through each section of the filter should be maintained equal to that through other sections of the filter if it is desired only to prevent channeling, or the rate through any given section of the filter should be maintained at the rate which gives the best results in that particular section.

What we claim and desire to protect by Letters Patent is:

1. The method of filtering which comprises introducing a liquid to be filtered to a filtering zone, flowing said liquid through a mass of filtering material maintained in said zone, withdrawing a plurality of streams of filtered liquid from different portions of said zone, measuring the rate of flow of each of said streams so regulating the rate of flow of each of said streams that the rate of flow of each stream is substantially proportional to the area of the filter from which each stream is withdrawn.

2. The method of filtering which comprises introducing a liquid to be filtered to a filtering zone, flowing said liquid through a mass of filtering material maintained in said zone, withdrawing a plurality of streams of filtered liquid from different portions of said filtering zone of substantially equal cross sectional area, measuring the rate of flow of each of said streams of liquid, and so regulating the flow of each of said streams that the rate of flow of all the streams is substantially equal.

3. The method of filtering which comprises introducing a liquid to be filtered to a filtering zone, flowing said liquid through a mass of filtering material maintained in said zone, withdrawing a plurality of streams of filtered liquid from different portions of said filtering zone, measuring the rate of flow of each of said streams of liquid, and so regulating the flow of each of said streams that they bear a pre-determined relation to each other.

4. The method of filtering which comprises introducing a liquid to be filtered to a filtering zone, flowing said liquid through a mass of filtering material maintained in said zone, withdrawing a plurality of streams of filtered liquid from different portions of said filtering zone, measuring the rate of flow of each of said streams of liquid, and so regulating the flow of each of said streams that they differ from each other in a pre-determined ratio.

LEON A. TARBOX.
WILLIAM HERMAN BARCUS.